(12) United States Patent
Kubo

(10) Patent No.: US 10,509,543 B2
(45) Date of Patent: Dec. 17, 2019

(54) CONTROL METHOD FOR ORDERING OF A DISPLAYED LIST, AND CONTROL APPARATUS AND STORAGE MEDIUM PROVIDED THEREWITH

(71) Applicant: CANON KABUSHIKI KAISHA, Tokyo (JP)

(72) Inventor: Hiroaki Kubo, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 353 days.

(21) Appl. No.: 15/433,102

(22) Filed: Feb. 15, 2017

(65) Prior Publication Data

US 2017/0249060 A1    Aug. 31, 2017

(30) Foreign Application Priority Data

Feb. 26, 2016  (JP) ................................ 2016-036022

(51) Int. Cl.
 *G06F 3/0482* (2013.01)
 *G09G 5/38* (2006.01)

(52) U.S. Cl.
 CPC ............ *G06F 3/0482* (2013.01); *G09G 5/38* (2013.01); *G09G 2340/0464* (2013.01); *G09G 2354/00* (2013.01)

(58) Field of Classification Search
 CPC ................... G06F 3/0482; G09G 5/38; G09G 2340/0464; G09G 2354/00
 See application file for complete search history.

(56) References Cited

U.S. PATENT DOCUMENTS

| 5,416,725 | A  | * | 5/1995  | Pacheco | G08B 25/14 340/5.54 |
| 2003/0197744 | A1 | * | 10/2003 | Irvine | G06F 3/038 715/856 |
| 2005/0102638 | A1 | * | 5/2005  | Jiang | G06F 3/0482 715/855 |
| 2008/0021967 | A1 | * | 1/2008  | Kato | G06Q 10/107 709/206 |
| 2008/0288494 | A1 | * | 11/2008 | Brogger | G06Q 30/02 |
| 2008/0313049 | A1 | * | 12/2008 | Lai | G06Q 10/087 705/27.1 |

(Continued)

FOREIGN PATENT DOCUMENTS

JP    2010-015256 A    1/2010

*Primary Examiner* — Mandrita Brahmachari
(74) *Attorney, Agent, or Firm* — Venable LLP

(57) ABSTRACT

The present invention is a control method for displaying a list in which a plurality of elements is sorted in accordance with a predetermined rule and includes a determination step of determining one or a plurality of first elements that are part of the plurality of elements and which are targets whose display position is to be changed based on a position specified in the predetermined display area by an operation of a user and a position into which the addition element is inserted in the list and a display control step of displaying the list in the predetermined display area, in which the addition element is added, a display position or display positions of the one or the plurality of first elements determined at the determination step are changed, and display positions of a plurality of second elements different from the one or the plurality of first elements within the plurality of elements are not changed.

19 Claims, 9 Drawing Sheets

(56) References Cited

U.S. PATENT DOCUMENTS

| | | | | |
|---|---|---|---|---|
| 2011/0317211 A1* | 12/2011 | Yamada | .................... | G06F 9/50 |
| | | | | 358/1.15 |
| 2013/0033525 A1* | 2/2013 | Markiewicz | .......... | G06F 3/0485 |
| | | | | 345/684 |
| 2014/0317565 A1* | 10/2014 | Bergmans | ............. | G06F 3/0488 |
| | | | | 715/810 |
| 2014/0337794 A1* | 11/2014 | Vranjes | ................ | G06F 3/0481 |
| | | | | 715/800 |
| 2016/0239904 A1* | 8/2016 | Washington | ....... | G06Q 30/0635 |

* cited by examiner

CONTROL METHOD FOR ORDERING OF A DISPLAYED LIST, AND CONTROL APPARATUS AND STORAGE MEDIUM PROVIDED THEREWITH

BACKGROUND OF THE INVENTION

Field of the Invention

The present invention relates to a technique to display a list of a plurality of elements to be presented sorted in accordance with a predetermined rule.

Description of the Related Art

A list-type user interface (hereinafter, UI) is a unit configured to present elements to be presented (hereinafter, presentation-target element) to a user by arranging and displaying them in the form of a list and in general, is used at the time of presenting elements sorted in accordance with a predetermined rule to a user. There is a technique to fix the display positions of part of the elements at the time of adding an element to a list in the list-type UI such as this.

Japanese Patent Laid-Open No. 2010-15256 describes producing a list display of thumbnails extracted from a plurality of thumbnails arranged in a predetermined order at predetermined extraction intervals. Further, adding a thumbnail to the list display due to the shortened extraction interval and deleting a thumbnail from the list display due to the lengthened extraction interval are described. Furthermore, producing a list display by changing the display positions of thumbnails of a plurality of displayed thumbnails except for a thumbnail that serves as a reference in adding and deleting a thumbnail in a list display is also described.

SUMMARY OF THE INVENTION

However, with the technique described in Japanese Patent Laid-Open No. 2010-15256, the display positions of all the elements except for the element that serves as a reference are changed in the list. That is, in the case where an element is added in the list or an element is deleted from the list, depending on the position of the addition or deletion, the display positions of the elements whose display position does not need to be changed are also changed.

Consequently, an object of the present invention is to provide a technique to display a list in which the display position of an element whose display position is to be changed is changed and the display position of an element whose display position does not need to be changed is not changed in adding an element to the list or deleting an element from the list.

The present invention is a control method for displaying a list in which a plurality of elements is sorted in accordance with a predetermined rule, and including: a determination step of, in a case where an addition element is added to the list in accordance with the predetermined rule while the list is displayed in a predetermined display area, determining one or a plurality of first elements that are part of the plurality of elements and which are targets whose display position is to be changed based on a position specified in the predetermined display area by an operation of a user and a position into which the addition element is inserted in the list; and a display control step of displaying the list in the predetermined display area, in which the addition element is added, a display position or display positions of the one or the plurality of first elements determined at the determination step are changed, and display positions of a plurality of second elements different from the one or the plurality of first elements within the plurality of elements are not changed.

Further features of the present invention will become apparent from the following description of exemplary embodiments (with reference to the attached drawings).

DESCRIPTION OF THE EMBODIMENTS

In the following, embodiments of the present invention are explained in detail. The following embodiments are not intended to limit the present invention according to the scope of the claims and all the combinations of the features explained below are not necessarily indispensable to solve the problem of the present invention.

Figure 1:
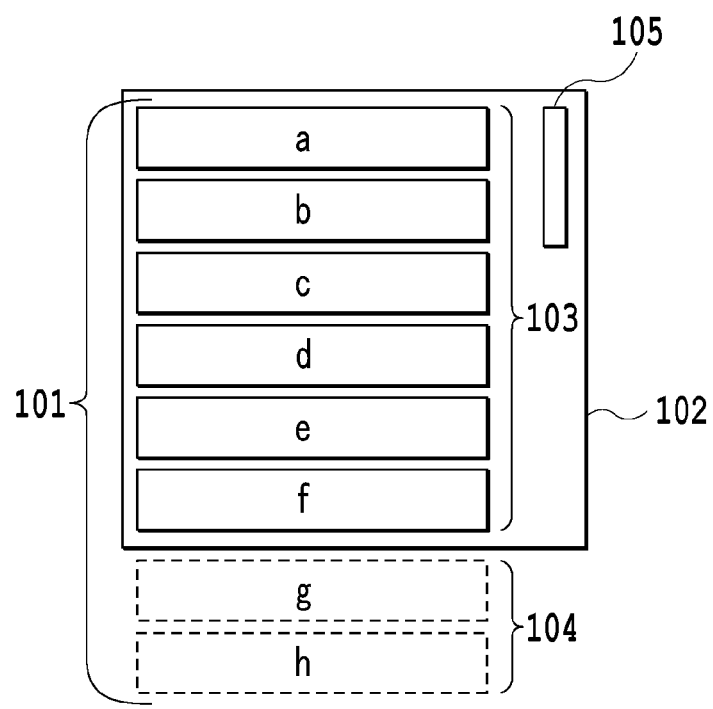
FIG. 1 is a conceptual diagram of a common list-type UI.

FIG. 1 is a conceptual diagram showing an example of a common list-type UI to which the present embodiment can be applied, and representing the case where eight display-target (also referred to as presentation-target) elements 101 (a to h) are presented by a list-type UI. Each of the presentation-target elements 101 has one or more pieces of information and part or all of the held information is displayed on the list-type UI. In this example, the letter of the alphabet held by each element is displayed. Further, at this time, the elements presented by the list-type UI are sorted in accordance with the information held by each element and arranged and displayed in a predetermined direction. In this example, each element is arranged and displayed from top to bottom in the order of the alphabet (ascending order). The number of elements that can be displayed simultaneously in a display area 102 making up the list-type UI is six at the maximum. Consequently, it is not possible for a user to browse the presentation-target elements g and h located outside the display area 102 or to perform the operation, such as an operation to select the elements. However, in the case where there are presentation-target elements 104 outside the display area 102, a scroll bar 105 indicating that scroll is possible may be displayed. In this example, in the case where a user slides the scroll bar 105 downward, the presentation-target elements 104 (g, h) located outside the display area 102 are slid into the display area 102, and therefore, it is made possible for the user to browse the elements g and h.

In the embodiment described below, explanation is given by using a list-type UI as explained by using FIG. 1 in which the presentation-target elements can move vertically by interlocking the elements with the slide bar and the elements sorted in the ascending order in accordance with held information are arranged and displayed in one direction. However, the UI to which the technique relating to the list update according to the present invention can be applied is not limited to the UI such as this. It is possible to apply the present invention to an arbitrary list-type UI that presents information to a user by arranging a plurality of elements on a display area in accordance with a rule determined in advance.

First Embodiment (Configuration of Computer Device)

Figure 2:
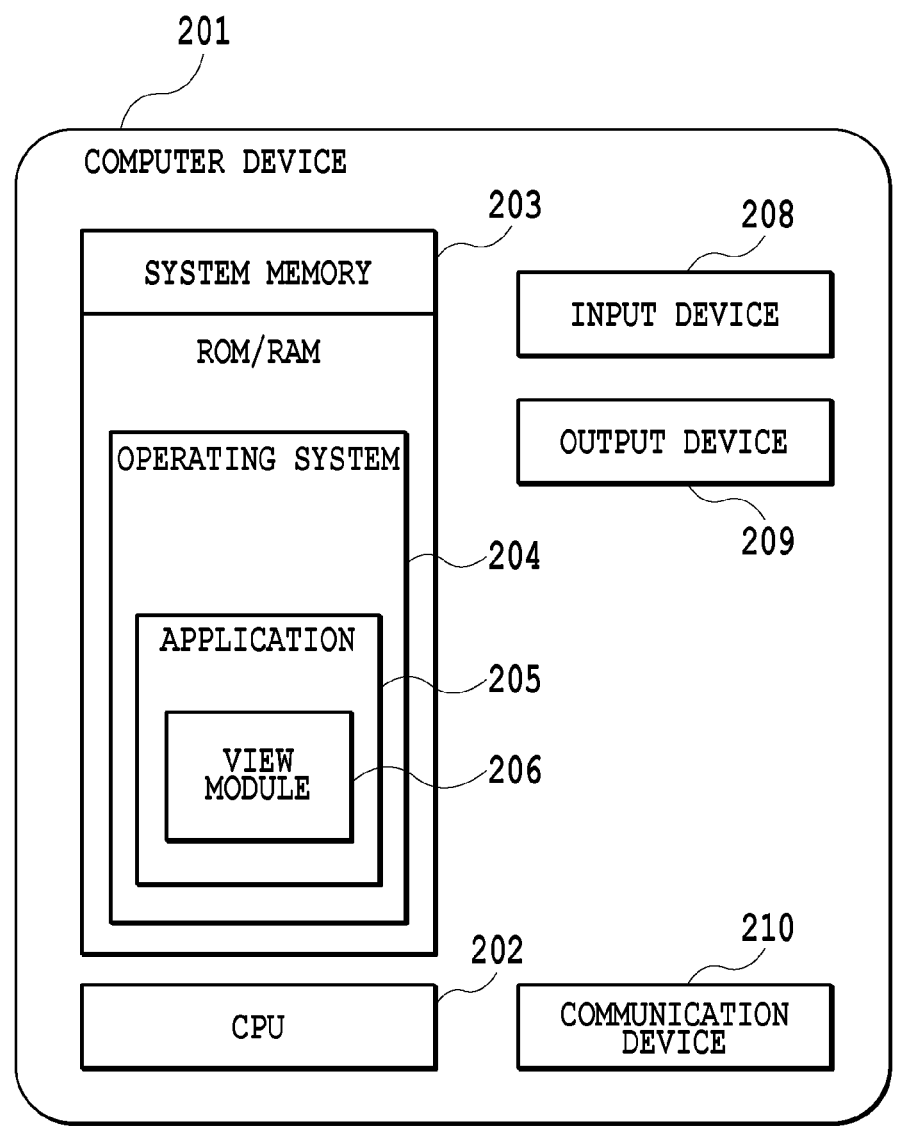
FIG. 2 is a block diagram showing a structure of a computer device according to a first embodiment.

FIG. 2 is a block diagram showing an example of a computer device that can package the present embodiment. A computer device 201 includes a CPU 202, a system memory 203, an input device 208, an output device 209, and a communication device 210. The computer device 201 may be a client device, which is a client of a service provided by a server. In general, the computer device 201 has at least one CPU 202 and at least one system memory 203. However, the computer device 201 may have a plurality of CPUs executing a program in cooperation with one another. Using a RAM as a work memory, the CPU 202 centralizedly controls each component by executing an operating system (hereinafter, OS) and various programs stored in a ROM, a hard disk drive, various storage media mounted on a general-purpose drive, etc. The programs executed by the CPU 202 include programs for performing processing according to the present embodiment, to be described later. The system memory 203 may be one of a volatile memory (e.g., RAM) and a nonvolatile memory (e.g., ROM, flash memory, etc.) or a combination of both a volatile memory and a nonvolatile memory. In the system memory 203, an OS 204, an application 205 that runs on the OS 204, and a view module 206 that is used in the application 205 are stored.

The input device 208 is a device for a user to give instructions to the computer device 201 and to input data and includes, for example, a keyboard, a mouse, a pen, a touch panel, etc. The output device 209 is a device to present information or the like indicating the state of the computer device 201 to a user and includes a display (e.g., CRT, liquid crystal display, etc.) to display a screen of the application 205. In the present embodiment, in the case where the application 205 is executed by the CPU 202, as the screen of the application 205, a list-type UI is displayed on the output device 209 and a user who sees the screen performs inputting via the list-type UI by using the input device 208. At this time, a point cursor and an area of interest or the like indicating which portion on the screen a user focuses his/her attention on, both of which operate in accordance with the operation of the user that is input by the input device 208, may be displayed on the output device 209. The communication device 210 performs data communication with an external device (e.g., server, printer, etc.) of the computer device 201 via a network.

Further, the computer device 201 may be a smartphone having a telephone function and a mail function. In the case where the computer device 201 is a smartphone, the input device 208 has a touch panel and the display area 102 is provided on the touch panel. In this case, the display screen, for example, shown in FIG. 1, is displayed on the touch panel and by a user performing a drag operation or a flick operation in the direction from bottom to top in FIG. 1 on the touch panel, the elements 104 (g, h) are displayed on the touch panel.

(Update Aspect of List)

Figure 3A:
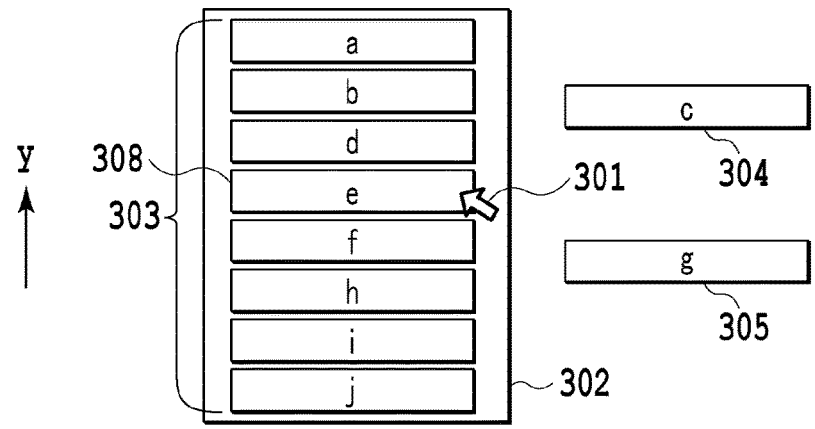
FIG. 3A to FIG. 3C are each a diagram explaining an update aspect of a list according to the first embodiment.
Figure 3B:
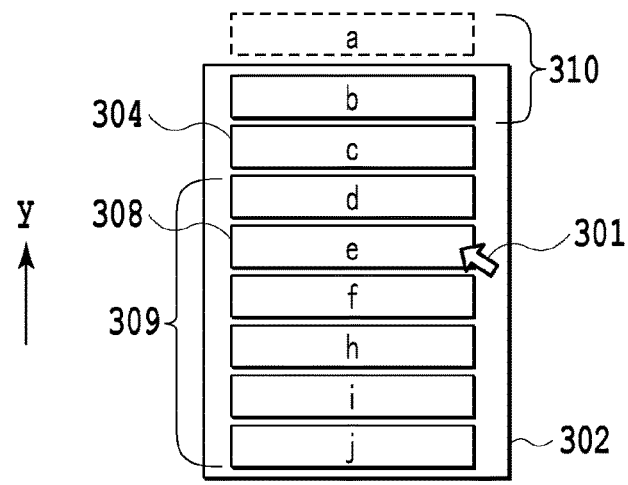
Figure 3C:
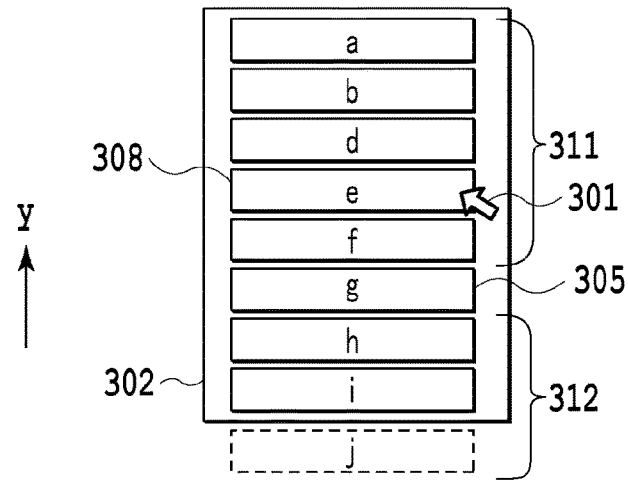

FIG. 3A to FIG. 3C are each a diagram showing an example of an update aspect of a list according to the present embodiment. For the sake of explanation, a coordinate axis is set as shown in each of FIG. 3A to FIG. 3C. FIG. 3A shows a pointer cursor 301 that is displayed on the output device 209 and a list-type UI. In this example, it is assumed that eight elements at the maximum can be displayed within a display area 302 of the list-type UI. Further, elements 303 displayed within the display area 302 are arranged and displayed based on information possessed by each element, specifically, arranged and displayed from top to bottom in the order of the alphabet (ascending order). At this time, by an update, the element c or the element g (addition element 304 or 305) is about to be added newly to the targets (presentation targets) presented in the list.

FIG. 3B shows the case where the element c is inserted into the display area 302 of the list-type UI and the element a is seen no longer as the result of newly adding the element c as the presentation target by the update. In this example, the elements that are presented by the list-type UI are sorted and displayed in the order of the alphabet in accordance with information possessed by each element and the element c is inserted between the element b and the element d, and therefore, it is possible to derive the position into which the element c is inserted in the display area 302. Further, in this example, the element e, which is estimated to have a strong relationship with a user because that pointer cursor 301 points at the element e on the screen, is taken to be a reference element 308. Here, the reference element is an element used as a reference that is taken into consideration at the time of determining how to insert or delete an element. The element pointed at by a pointer cursor by a user has a strong possibility of being an element the user tries to select, and therefore, it should be avoided to move the element at random on the screen. Consequently, in the present embodiment, by using the element e pointed at by the pointer cursor as the reference element whose position is fixed, a reduction of usability is prevented.

After the derivation of the reference element 308, a plurality of elements (including the reference element 308, also called lower elements) 309 (d, e, f, h, i, j) lower than the position of the element c, which is an addition target, is specified as elements whose display position is not changed. Then, the display positions of the lower elements 309 are fixed on the display area 302. Then, elements (also called higher elements) 310 (a, b) higher than the lower elements on the list-type UI are specified as elements whose display position is changed or which are not displayed. Then, the elements are slid in the upward direction (in the positive y-direction) by an amount corresponding to one element and the element c is inserted into the vacant position. At this time, the element a moved to the outside of the display area 302 capable of displaying eight elements at the maximum is no longer seen from a user.

FIG. 3C shows the case where the element g is inserted into the display area 302 of the list-type UI and the element j is no longer seen as the result of newly adding the element g as the presentation target by the update. In this example, the elements presented by the list-type UI are sorted and displayed in the order of the alphabet in accordance with information possessed by each element and the element g is inserted between the element f and the element h, and therefore, it is possible to derive the position into which the element g is inserted in the display area 302. Further, in this example, the element e pointed at by the pointer cursor 301 on the screen is taken to be the reference element 308 and the positions of a plurality of elements (higher elements including the reference element 308) 311 (a, b, d, e, f) higher than the position of the element g, which is an addition target, are fixed on the display area 302. Then, elements 312 (h to j) lower than the higher elements on the list-type UI are slid in the downward direction (negative y-direction) by an amount corresponding to one element and the element g is inserted into the vacant position. At this time, the element j moved to the outside of the display area 302 capable of displaying eight elements at the maximum is no longer seen from a user.

In the examples shown in FIG. 3A to FIG. 3C, the reference element 308 is derived by using the pointer cursor 301 displayed on the screen. However, what can be used to derive a reference element is not limited to the pointer cursor. It may also be possible to derive a reference element based on a position that can be defined by a pointer that moves by the operation of a user, another arbitrary object, etc. It may also be possible to use anything that can define a position on the output device 209 by the operation of a user that is input through the input device 208 to derive a reference element and this may not be displayed on the output device 209. For example, in the case where the input device 208 is a touch panel, an element touched by a user may be taken to be a reference element.

(Derivation Method of Reference Element)

Figure 4:
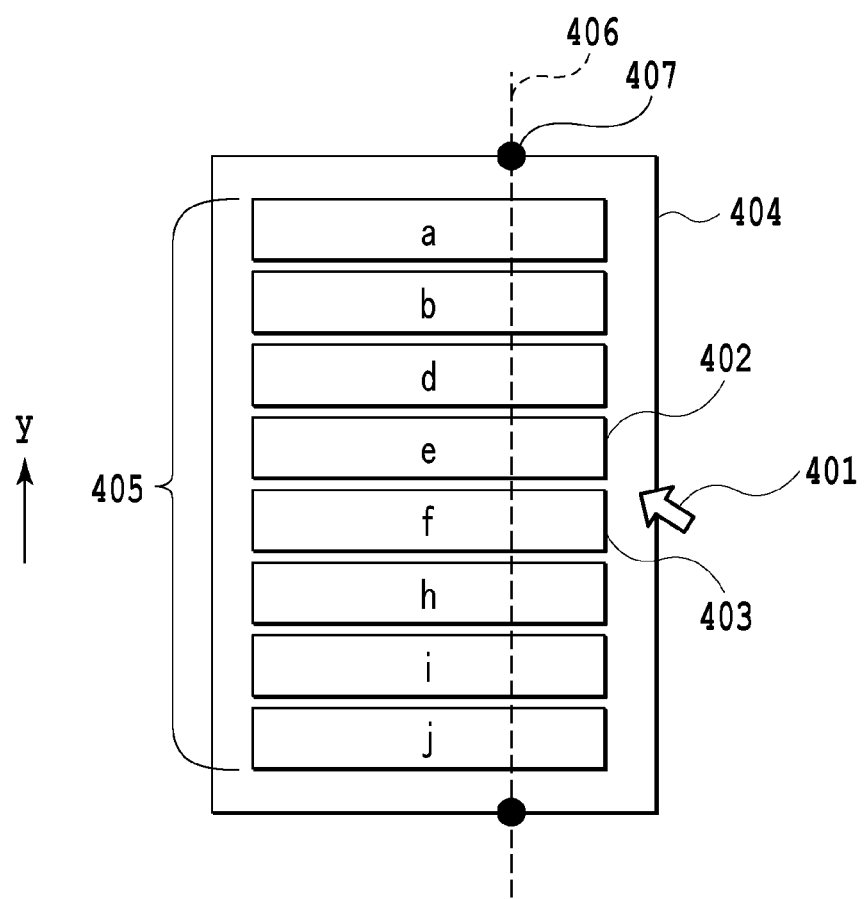
FIG. 4 is a diagram explaining a method of deriving a reference element according to the first embodiment.

FIG. 4 is a diagram for explaining which reference candidate of a plurality of candidates should be selected in the case where the plurality of reference element candidates is derived at the time of deriving a reference element. For the sake of explanation, a coordinate axis is set as shown in FIG. 4. As shown in FIG. 4, in this example, the elements whose distance from the portion pointed at by a pointer cursor 401 is the shortest are two of the element e and the element f. Consequently, in the case where the element nearest to the portion pointed at by the pointer cursor 401 is taken to be a reference element, the element e and the element f are derived as candidates (reference element candidates 402 and 403). In the case such as this, by obtaining an intersection point 407 at which a frame line of a display area 404 and a straight line 406 along the direction (y-axis direction) in which elements 405 are arranged intersect each other and by selecting a reference element candidate nearest to the intersection point 407, it is possible to finally derive one reference element. In the case where there exists a plurality of intersection points of the frame line of the display area and the straight line along the direction in which the elements are arranged, it is possible to use arbitrary one point of the plurality of intersection points. As shown in FIG. 4, in this example also, the two intersection points exist, but the intersection point 407 on the upper side of the two intersection points is used, and therefore, the reference element is the element e, not the element f.

(Element Addition Processing)

Figure 5:
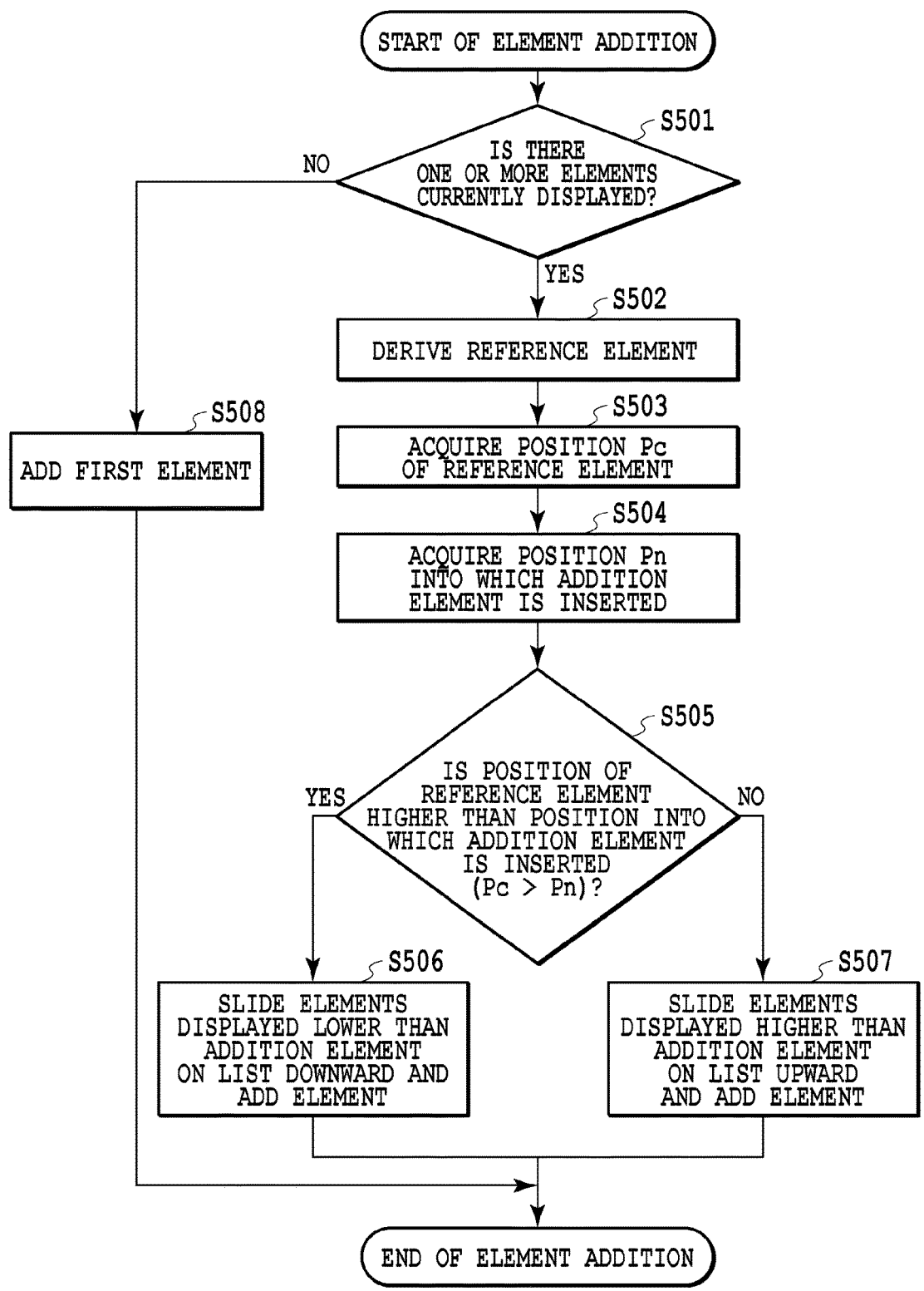
FIG. 5 is a flowchart of processing that is performed at the time of adding an element to be presented on a list-type UI according to the first embodiment.

FIG. 5 is a flowchart showing an example of processing that is performed at the time of adding an element to be presented on the list-type UI according to the present embodiment. This processing is implemented by the CPU 202 of the computer device 201 executing a program. Further, this processing starts at predetermined timing in accordance with the necessity, such as at timing at which the list is updated dynamically, irrespective of the intention of a user.

First, at step S501 (hereinafter, step S501 is abbreviated to S501 and the other steps are also abbreviated similarly), whether or not there is one or more elements that are displayed currently in the display area of the list-type UI is determined. In the case where the results of the determination indicate that there is one or more elements that are displayed in the display area, the processing proceeds to S502. On the other hand, in the case where the results of the determination indicate that there is not one or more elements (in the case where, there is no element that is displayed in the display area), the processing proceeds to S508.

At S502, a reference element is derived. As described previously, the reference element is an element that serves as a reference at the time of determining how to add an element and in the element addition processing, the position of the reference element is fixed on the screen, i.e., in the display area. At S503, the position (assumed to be indicated by Pc) of the reference element derived at S502 is acquired. At S504, the position (assumed to be indicated by Pn) into which an addition element is inserted is acquired based on the sort condition and information held by the element that is added newly.

At S505, the position Pc acquired at S503 is compared with the position Pn acquired at S504 and whether or not the reference element is higher than the element to be added newly on the list (Pc>Pn) is determined. Here, explanation is given on the premise that the y-axis is set as shown in FIG. 3A to FIG. 3C and FIG. 4, Pc and Pn are each one y-value, and the element whose y-value is great is located at the position higher than that of the element whose y-value is small. In the case where the results of the determination at S505 indicate that the reference element is higher than the element to be added newly (in the case where Pc>Pn), the processing proceeds to S506. On the other hand, in the case where the results of the determination indicated that the reference element is not higher than the element to be added newly (in the case where Pc<Pn), the processing proceeds to S507.

At S506, the elements that are displayed lower than the element to be added newly on the list are slid in the downward direction (negative y-direction) and the new element is inserted into the vacant position. At S507, the elements that are displayed higher than the element to be added newly on the list are slid in the upward direction (positive y-direction) and the new element is inserted into the vacant position. At S508, to the display area in which no element is displayed, the new element (first element) is added. The above is the element addition processing.

(Element Deletion Processing)

Figure 6:
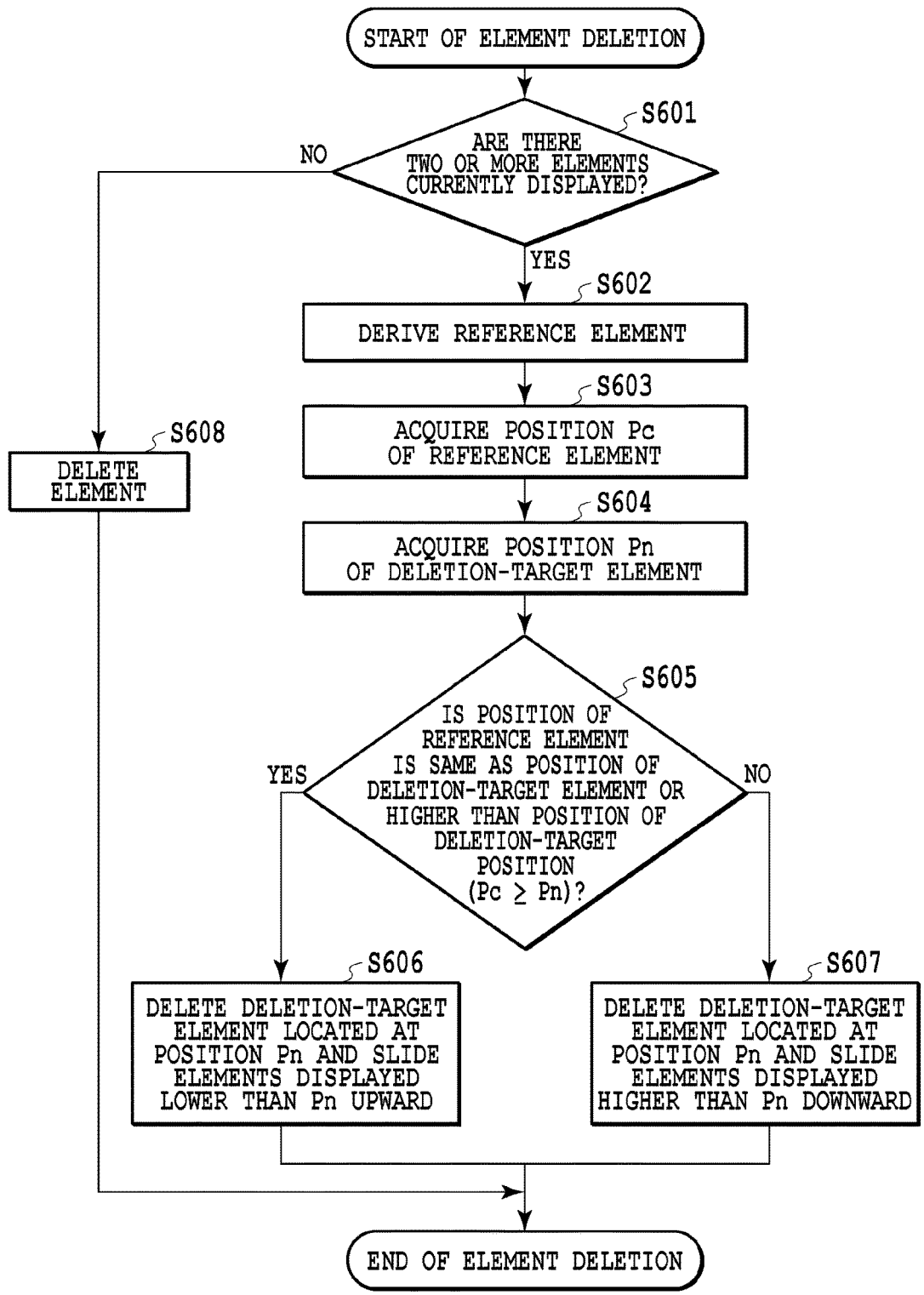
FIG. 6 is a flowchart of processing that is performed at the time of deleting an element that is presented on the list-type UI according to the first embodiment.

FIG. 6 is a flowchart showing an example of processing that is performed at the time of deleting an element being presented on the list-type UI according to the present embodiment. This processing is implemented by the CPU 202 of the computer device 201 executing a program. Further, this processing starts at predetermined timing in accordance with the necessity, such as timing at which the list is updated dynamically, irrespective of the intention of a user. However, this processing is processing to delete an element having been a presentation target, and therefore, this processing premises that at least one element is displayed on the list-type UI.

First, at S601, whether or not there are two or more elements that are displayed currently in the displayed area of the list-type UI is determined. In the case where the results of the determination indicate that there are two or more elements that are displayed in the display area, the processing proceeds to S602. On the other hand, in the case where the results of the determination indicated that there are not two or more elements (in the case where there is one element that is displayed in the display area), the processing proceeds to S608.

At S602, a reference element is derived. As described above, the reference element is an element that serves as a reference at the time of determining how to delete an element. At S603, the position (assumed to be indicated by Pc) of the reference element derived at S602 is acquired. At S604, the position (assumed to be indicated by Pn) of a deletion element to be deleted (hereinafter, also referred to as deletion-target element) is acquired.

At S605, the position Pc acquired at S603 is compared with the position Pn acquired at S604 and whether or not the position of the reference element is the same as the position of the deletion-target element or higher than the position of the deletion-target element on the list (Pc≥Pn) is determined. Here, as in the element addition processing described above, explanation is given also on the premise that the y-axis is set as shown in FIG. 3A to FIG. 3C and FIG. 4, Pc and Pn are each one y-value, and the element whose y-value is great is located at the position higher than that of the element whose y-value is small. In the case where the results of the determination at S605 indicate that the position of the reference element is the same as the position of the deletion-target element or higher than the position of the deletion-target element (in the case where Pc≥Pn), the processing proceeds to S606. On the other hand, in the case where the results of the determination are indicate that the position of the reference element is the same as the position of the deletion-target element or higher than the position of the deletion-target element (in the case where Pc<Pn), the processing proceeds to S607.

At S606, the deletion-target element located at the position Pn is deleted and the elements that are displayed lower than the position Pn on the list are slid in the upward direction (positive y-direction). At S607, the deletion-target element located at the position Pn is deleted and the elements that are displayed higher than the position Pn on the list are slid in the downward direction (negative y-direction). At S608, from the display area in which only one element is displayed, the deletion-target element is deleted. The above is the element deletion processing.

By the processing shown in FIG. 5 and FIG. 6, as an element within the plurality of elements included in the list, whose display position is to be changed and which is not a reference element, the element to be slid in the list is determined and the direction of the slide is determined.

Specifically, the direction from the reference element toward the position into which the addition element is inserted or toward the position of the deletion element is determined to be the direction of the slide in the list. Further, the element that is displayed at the position more distant from the reference element in the direction of the slide than the position into which the addition element is inserted or the position of the deletion element is determined to be an element to be slid.

On the other hand, the element that is displayed between the position into which the addition element is inserted and the position of the reference element or between the position of the deletion element and the position of the reference element in the direction of the slide is not determined to be an element to be slid. Further, in the list, the element arranged on the opposite side of one side on which the position into which the addition element is inserted or the position of the deletion element exists in the case where the position of the reference element is taken to be a reference is also not determined to be an element to be slid.

Consequently, for example, in the case where an element is added or deleted in the area at the upper end portion or the lower end portion of a predetermined display area in which the list is displayed, the display position is not changed for the elements other than the elements in the vicinity of the end portions. Because of this, it is possible to suppress the change of the display position of the element of interest even in the case where an element is added or deleted, for example, while a user is focusing his/her attention on the element being displayed in the predetermined display area.

Second Embodiment

In the first embodiment, the reference element is determined based on the position defined by an object, such as a pointer cursor that moves in accordance with the operation of a user. In the present embodiment, a reference element is determined based on information held by an element. In the following, explanation of the contents in common to those of the first embodiment is simplified or omitted.

Figure 7:
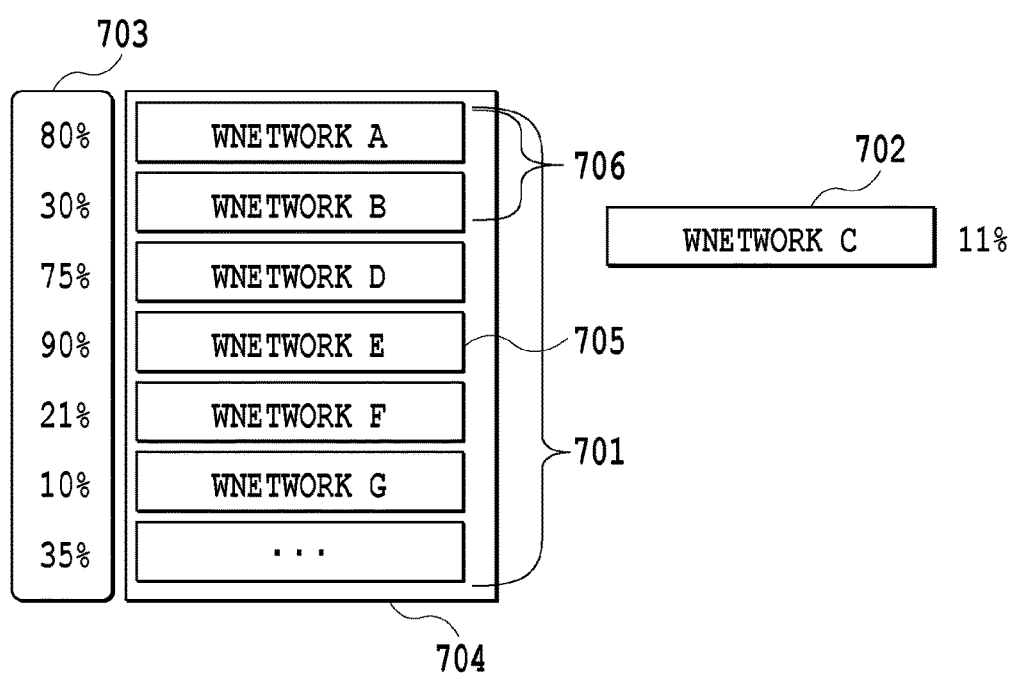
FIG. 7 is a diagram explaining a method of deriving a reference element according to a second embodiment.

FIG. 7 is a diagram for explaining a derivation method of a reference element according to the present embodiment and is a conceptual diagram showing an example of a list-type UI that is displayed at the time of selecting a wireless network. As shown schematically, in this example, each presentation-target element 701 holds two pieces of information: a wireless network name and an electromagnetic wave intensity 703. Further, the elements 701 are sorted in the ascending order in accordance the name held by each element and displayed in a display area 704 and an element WNetworkC (addition element 702) is about to be added newly to the presentation targets by an update. At this time, the element WNetworkC, which is the addition element 702, is inserted between an element WNetworkB and an element WNetworkD.

As described above, each element that is presented on the list-type UI holds information, i.e., the electromagnetic wave intensity 703. The electromagnetic wave intensity indicates how far the electromagnetic wave reaches and the greater the value, the stronger the electromagnetic wave is. In the present embodiment, a reference element is derived by using the electromagnetic wave intensity 703. Specifically, it is supposed that a user desires a wireless network whose value of the electromagnetic wave intensity 703 is great, and therefore, WNetworkE having the highest electromagnetic wave intensity of the elements displayed in the display area 704 is derived as a reference element 705. As in the first embodiment, in the processing to add an element, the position of the reference element 705 is fixed in the display area 704.

The aspect after the derivation of the reference element 705, in which the element WNetworkC is newly added, is the same as that of the first embodiment. That is, the positions of the elements (including the reference element 705) lower than the element WNetworkC are fixed. Next, elements 706 (WNetworkA, WNetworkB) higher than the element WNetworkC are slid in the upward direction by an amount corresponding to one element. Next, the element WNetworkC is inserted into the vacant position. In the case where the addition element is inserted into the position lower than the reference element 705 on the list, the elements lower than the addition element are slid in the downward direction and the addition element is inserted into the vacant position as in the first embodiment.

In the above-described explanation, the case is explained where each presentation-target element holds two pieces of information, but each may hold three or more pieces of information. In the case such as this, a reference element is derived by using arbitrary one of the three or more pieces of information held by each element. Further, the information that is used at the time of deriving a reference element may be presented in such a manner that a user can recognize or may not be presented.

Third Embodiment

In the first embodiment, the reference element is derived based on the position of the pointer cursor that moves in accordance with the operation of a user and in the second embodiment, the reference element is derived based on information held by the element. In the present embodiment, a reference element is derived based on a reference line that is provided in accordance with a display area of a list-type UI.

Figure 8:
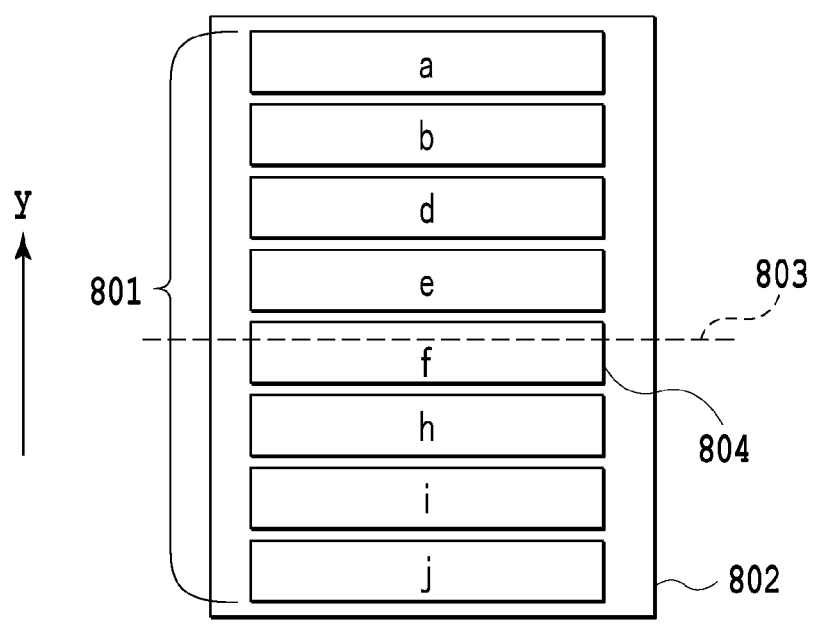
FIG. 8 is a diagram explaining a method of deriving a reference element according to a third element.

FIG. 8 is a diagram for explaining a derivation method of a reference element according to the present embodiment. For the sake of explanation, a coordinate axis is set as shown in FIG. 8. In this example, it is assumed that eight elements at the maximum can be displayed in a display area 802 of a list-type UI. Further, elements 801 displayed within the display area 802 are arranged and displayed from top to bottom in the order of the alphabet (ascending order). As indicated by a broken line in FIG. 8, in this example, a line (hereinafter, reference line) 803 perpendicular to the direction (y-axis direction) in which the elements 801 are arranged is provided and a reference element 804 is derived by using the reference line 803. Specifically, the element nearest to the reference line 803 is derived as the reference element 804. In the case where an update is performed in the state shown in FIG. 8, the element f nearest to the reference line 803 is derived as the reference element 804.

It is possible to set a line perpendicular to the direction in which the elements 801 are arranged within the display area 802 at an arbitrary position as a reference line used to obtain a reference element. That is, the y-value possessed by the reference line may be arbitrary one value. Further, the reference line may be presented on the output device 209 in such a manner that a user can recognize or may not be presented.

Fourth Embodiment

Figure 9:
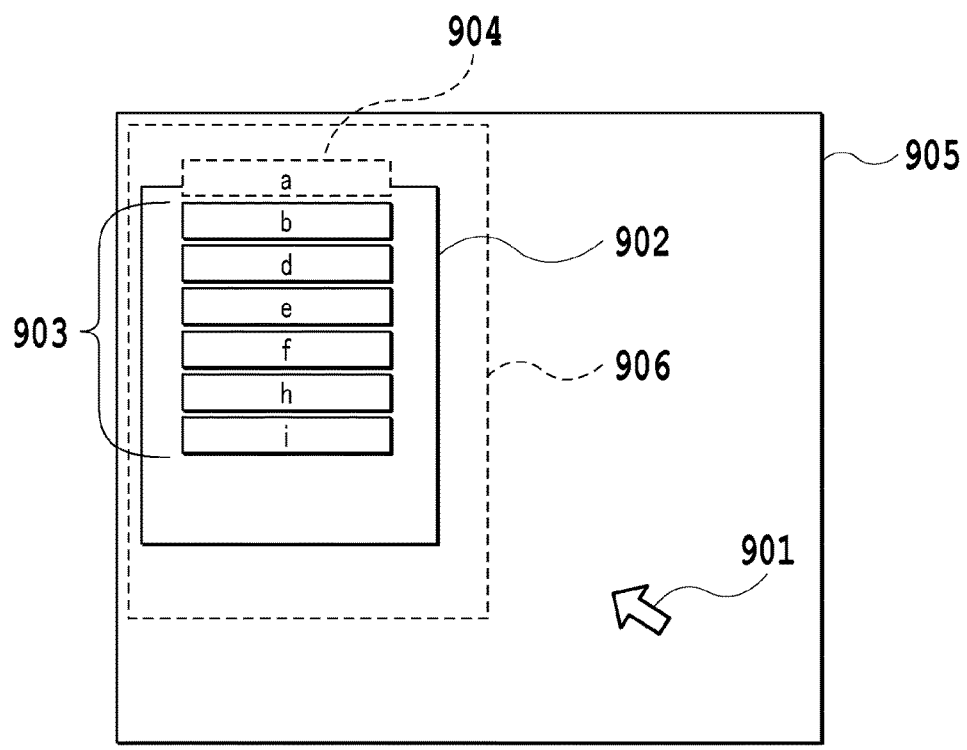
FIG. 9 is a diagram explaining an update aspect of a list according to a fourth embodiment.

FIG. 9 is a diagram for explaining an update aspect of a list according to the present embodiment. FIG. 9 shows a pointer cursor 901 displayed on a screen 905 of the output device 209 and a list-type UI. In this example, it is assumed that eight elements at the maximum can be displayed in a display area 902 of the list-type UI. Further, elements 903 displayed within the display area 902 are arranged and displayed from top to bottom in the order of the alphabet (ascending order). At this time, the element a (addition element 904) is about to be added newly by an update.

In the case where the element i is derived as a reference element and the display positions of the elements 903 (including the element i, which is the reference element) lower than the element a to be added newly are fixed, there is a possibility that the element a is not displayed in the display area 902. Because the elements displayed in the display area 902 are not changed as described above despite that the presentation target is added by the update of the list, there is a case where a user does not notice the update as a result.

Consequently, in the present embodiment, on the periphery of the display area 902 of the list-type UI displayed on the screen 905, an area 906 having an arbitrary size is defined so as to include the display area 902. Then, at the time of updating the list, whether or not the pointer cursor 901 that can move on the screen 905 by the operation of a user is included in the area 906 is determined. In the case where the results of the determination indicate that the pointer cursor 901 is included in the area 906, the position of the reference element is fixed in the display area 902 and then the new element is added. The processing in this case is the same as that in the first embodiment. On the other hand, in the case where the pointer cursor 901 is not included in the area 906, the new element is added without fixing the position of the reference element in the display area 902. For example, in the case shown in FIG. 9, the position of the reference element i is not fixed, and therefore, it may be possible to slide the elements 903 lower than the element a to be added newly downward by an amount corresponding to one element and then to insert the element a into the vacant position. In this manner, a user can visually recognize the element a, and therefore, it is possible for the user to notice the update of the list.

As described above, in the present embodiment, whether or not the pointer cursor 901 is included in the area 906 is determined at the time of updating the list and in accordance with the results of the determination, the behavior of the reference element (whether or not to fix the position of the reference element in the display 902) is determined. That is, in the case where the pointer cursor 901 is located on the display area 902 or near the display area 902, it is estimated that a user focuses his/her attention on the display area 902, and therefore, the elements 903 including the reference element are not moved on the display area 902. On the other hand, in the case where the point cursor 901 is apart from the display area 902, it is estimated that a user does not focus his/her attention on the display area 902, and therefore, the elements 903 including the reference element are moved on the display area. Due to this, even in the case where a user does not focus his/her attention on the display area 902, the user is notified of that the update has been performed.

The area 906 that is used to determine whether or not to fix the position of the reference element may be presented on the output device 209 in such a manner that a user can recognize or may not be presented.

The method of displaying the element a in the example shown in FIG. 9 is not limited to the above-described method. For example, in the case where an element is added, whether the number of elements after the addition exceeds the upper limit number of elements that can be displayed (in the above-described example, eight) is determined. Further, in the case where the display positions of the elements are fixed based on the reference element, whether the element to be added is located outside the display area is determined. It is possible to implement this determination by performing the processing shown in FIG. 5 so as not to be reflected in the display results and by determining the position of the addition element after the processing. Then, the condition that "the number of elements within the list after the element addition exceeds the upper limit number" and the condition that "in the case where the display positions of the elements are fixed, the addition element is located outside the display area" are taken to be the conditions for the determination of whether nor not the processing to fix the display positions of the elements is necessary. For example, in the case where both the conditions described above are satisfied, the element a is added by fixing the display positions of at least part of the elements within the list in accordance with the results of the processing shown in FIG. 5. Alternatively, it may also be possible to add the element a by fixing the display positions of at least part of the elements within the list in the case where one of the above-described two conditions is satisfied.

In the case where the latter condition of the above-described two conditions is used, in the stage where the element addition is reflected in the list display, the processing shown in FIG. 5 has already been performed for the determination of the condition. Because of this, it may also be possible to produce the list display after the element addition by using the results of the processing shown in FIG. 5 which has been performed for the determination of the condition. Due to this, it is not necessary to perform the processing again shown in FIG. 5 for the list display, besides the condition determination.

Other Embodiments

As the "element" explained in the above-described embodiments, various elements can be employed. For example, there may be a case where the computer device 201 searches for a peripheral device (printer or the like) on a network, such as a LAN (Local Area Network), by a network interface, not shown schematically. At this time, the "element" may be a display item (printer model type name or the like) indicating the device that is searched for. In this case, for example, a list display is produced in which the model type names are arranged in the order of the alphabet or in the order of number. For example, in a printer search on a LAN, the computer device 201 issues a printer search signal. Then, in the case where there is a response including a model type name to the signal, a list display of the model type name is produced by the computer device 201. In this case, upon receipt of a response, the computer device 201 produces a list display when necessary, and therefore, there is a possibility that a new model type name is added while model type names of several printers are already displayed. In the list display, the model type names are arranged in the order of the alphabet or in the order of number, and therefore, as shown in FIG. 3A to FIG. 3C, there is a possibility that a model type name is inserted into the list being displayed. Because of this, it is also possible to apply the above embodiments to the list display in the printer search processing as described above.

Further, in the above embodiments, explanation is given by taking the list-type UI in which the element is slid vertically as an example, but it is also possible to apply the present invention to a list-type UI in which the element is slid in an arbitrary direction, such as a horizontal direction.

Furthermore, in the above embodiments, the display control to slide the element is performed at the time of changing the display position of the element, but the display control in the present embodiments is not limited to this. For example, it may also be possible to cause the computer device 201 to newly create a list in which the display position of the element is changed on the memory and to display the created list in place of the list being displayed. That is, what is required is to display a list in which the display position of the element is changed even in the case where the element is not slid on the display.

It is also possible to use a method that combines the plurality of embodiments described above to, for example, derive a reference element.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to display a list in which the display position of an element whose display position is to be changed is changed and the display position of an element whose display position does not need to be changed is not changed in adding an element to a list or deleting an element from a list.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-036022, filed Feb. 26, 2016, which is hereby incorporated by reference wherein in its entirety.

What is claimed is:

1. A control method, performed by at least one processor by executing a program stored in a memory, for displaying a list in which a plurality of elements is sorted in accordance with a predetermined rule, the control method comprising:
specifying one of the elements in the list as a designated element which is designated by a user;
determining an order of the designated element in the list based on the predetermined rule;
acquiring, in a case where an addition element is added to the list while the list is displayed in a predetermined display area, an order for the addition element in the list into which the addition element is inserted, wherein the order is determined based on the predetermined rule and the plurality of elements which have been included in the list; and
displaying the list in which the addition element is added, in the predetermined display area, based on an order of the designated element specified in the specifying and the acquired order of the addition element, wherein at the displaying, in a case where the order of the addition element is higher than the order of the designated element, one or more display positions of one or more elements having one or more orders lower than the designated element and the designated element are not changed from their respective positions in the list before the addition, and one or more display positions of one or more elements having one or more orders higher than the designated element are changed from their respective positions in the list before the addition, and wherein at the displaying, in a case where the order of the addition element is lower than the order of the designated element, one or more display positions of one or more elements having one or more orders higher than the designated element and the designated element are not changed from their respective positions in the list before the addition, and one or more display positions of one or more elements having one or more orders lower than the designated element are changed from their respective positions in the list before the addition.

2. The control method according to claim 1, wherein at the displaying, one or more display positions of one or more elements having one or more orders between the designated element and the addition element are not changed.

3. The control method according to claim 1, wherein an order into which the addition element is inserted is specified based on the predetermined rule and information held by the addition element.

4. The control method according to claim 1, wherein the designated element is specified based on a position of a pointer cursor that moves on a screen by an operation of the user.

5. The control method according to claim 4, wherein at the displaying, on condition that the pointer cursor is included in a defined area including the predetermined display area, the list in which display positions of a plurality of elements are not changed is displayed in the predetermined display area.

6. The control method according to claim 1, wherein at the displaying, on condition that the addition element is displayed in the predetermined display area by adding the addition element, the list in which display positions of a plurality of elements are not changed is displayed in the predetermined display area.

7. The control method according to claim 1, wherein in a case where a deletion element is deleted from the list while the list is displayed in the predetermined display area, one or the plurality of elements are further determined based on the order of the designated element and an order of the deletion element in the list, and at the displaying, the list is further displayed in the predetermined display area, in which the deletion element is deleted, a display position or display positions of the one or the plurality of determined elements are changed, and display positions of a plurality of elements different from the one or the plurality of determined elements within the plurality of elements are not changed.

8. The control method according to claim 1, further comprising searching for a device on a network, wherein the plurality of elements is a plurality of display items indicating devices searched for at the search, and while a list in which the plurality of display items is arranged is displayed, a display element indicating a device newly searched for at the search is added as the addition element.

9. The control method according to claim 8, wherein at the search, a printer is searched for.

10. The control method according to claim 1, further comprising:

determining one or the plurality of the elements that are part of the plurality of elements and which are targets whose display position is to be changed, based on an order of the designated element specified in the specifying and the acquired order of the addition element.

11. The control method according to claim 10, wherein at the determination one or a plurality of elements to be slid in the list are determined and a direction of a slide in the list is determined, and at the displaying, in the predetermined display area, by sliding the one or the plurality of determined elements determined to be targets of the slide at the determination in a direction determined at the determination and by not sliding a plurality of elements different from the one or the plurality of determined elements, the list is displayed in the display area.

12. The control method according to claim 11, wherein at the determination, a direction from the designated element toward an order into which the addition element is inserted in the list is determined to be a direction of the slide and one or a plurality of elements displayed at a position or positions more distant from the designated element than an order into which the addition element is inserted in a direction of the slide are determined to be one or a plurality of elements that are targets of the slide.

13. The control method according to claim 1, wherein the list is displayed in the predetermined display area, such that the plurality of elements are arranged along with a predetermined direction.

14. The control method according to claim 1, wherein the predetermined direction is a vertical direction in the predetermined display area.

15. The control method according to claim 1, wherein the predetermined direction is a horizontal direction in the predetermined display area.

16. The control method according to claim 1, wherein the plurality of elements are sorted based on an alphabet held by each of the plurality of elements.

17. The control method according to claim 1, wherein at the displaying, in a case where the order of the addition element is higher than the order of the designated element, one or more elements having one or more orders higher than the addition element disappear from the predetermined display area after the addition.

18. A control apparatus for displaying a list in which a plurality of elements is sorted in accordance with a predetermined rule, the control apparatus comprising:

a memory configured to store a program; and
at least one processor configured to execute the program stored in the memory, so as to perform steps comprising at least:
specifying one of the elements in the list as a designated element which is designated by a user;
determining an order of the designated element in the list based on the predetermined rule;

acquiring, in a case where an addition element is added to the list while the list is displayed in a predetermined display area, an order for the addition element in the list into which the addition element is inserted, wherein the order is determined based on the predetermined rule and the plurality of elements which have been included in the list; and displaying the list in which the addition element is added, in the predetermined display area, based on an order of the designated element specified in the specifying and the acquired order of the addition element, wherein at the displaying, in a case where the order of the addition element is higher than the order of the designated element, one or more display positions of one or more elements having one or more orders lower than the designated element and the designated element are not changed from their respective positions in the list before the addition, and one or more display positions of one or more elements having one or more orders higher than the designated element are changed from their respective positions in the list before the addition, and wherein at the displaying, in a case where the order of the addition element is lower than the order of the designated element, one or more display positions of one or more elements having one or more orders higher than the designated element and the designated element are not changed from their respective positions in the list before the addition, and one or more display positions of one or more elements having one or more orders lower than the designated element are changed from their respective positions in the list before the addition.

19. A non-transitory computer readable storage medium storing a program for causing a computer to perform a control method, performed by at least one processor by executing a program stored in a memory, for displaying a list in which a plurality of elements is sorted in accordance with a predetermined rule, the control method comprising:

specifying one of the elements in the list as a designated element which is designated by a user;

determining an order of the designated element in the list based on the predetermined rule;

acquiring, in a case where an addition element is added to the list while the list is displayed in a predetermined display area, an order for the addition element in the list into which the addition element is inserted, wherein the order is determined based on the predetermined rule and the plurality of elements which have been included in the list; and displaying the list in which the addition element is added, in the predetermined display area, based on an order of the designated element specified in the specifying and the acquired order of the addition element, wherein at the displaying, in a case where the order of the addition element is higher than the order of the designated element, one or more display positions of one or more elements having one or more orders lower than the designated element and the designated element are not changed from their respective positions in the list before the addition, and one or more display positions of one or more elements having one or more orders higher than the designated element are changed from their respective positions in the list before the addition, and wherein at the displaying, in a case where the order of the addition element is lower than the order of the designated element, one or more display positions of one or more elements having one or more orders higher than the designated element and the designated element are not changed from their respective positions in the list before the addition, and one or more display positions of one or more elements having one or more orders lower than the designated element are changed from their respective positions in the list before the addition.

* * * * *